Jan. 5, 1960  A. BLAIN  2,919,923
AUTOMATIC RECORD PLAYER
Filed Nov. 15, 1951  7 Sheets-Sheet 1

INVENTOR.
ALBERT BLAIN
BY
Woodcock and Phelan
ATTORNEYS

INVENTOR.
ALBERT BLAIN
BY
*Woodcock and Phelan*
ATTORNEYS

Jan. 5, 1960 — A. BLAIN — 2,919,923
AUTOMATIC RECORD PLAYER
Filed Nov. 15, 1951 — 7 Sheets-Sheet 3

INVENTOR.
ALBERT BLAIN
BY
Woodcock and Phelan
ATTORNEYS

Jan. 5, 1960     A. BLAIN     2,919,923
AUTOMATIC RECORD PLAYER

Filed Nov. 15, 1951     7 Sheets-Sheet 4

*INVENTOR.*
ALBERT BLAIN
BY
Woodcock and Phelan
ATTORNEYS

Jan. 5, 1960  A. BLAIN  2,919,923
AUTOMATIC RECORD PLAYER

Filed Nov. 15, 1951  7 Sheets-Sheet 6

INVENTOR.
ALBERT BLAIN
BY Woodcock and Phelan
ATTORNEYS

Inventor
ALBERT BLAIN

United States Patent Office 2,919,923
Patented Jan. 5, 1960

2,919,923

AUTOMATIC RECORD PLAYER

Albert Blain, Philadelphia, Pa.

Application November 15, 1951, Serial No. 256,524

20 Claims. (Cl. 274—10)

This invention relates to automatic record changers and players.

In accordance with the invention, a stack of records to be played is supported by engagement of the bottom record with the step of a center-post for the stack and with the ledge of a rim support and release of the bottom record for playing is effected by mechanism which moves the center-post toward and from the rim support in a vertical plane passing through the axis of rotation of the record turntable and the rim support. More specifically, in one modification, the turntable and center-post are oscillated in an arcuate path toward and from the rim support to effect release of the bottom record; in a second modification, only the center-post is rocked, the turntable remaining in its normal playing position during the record-changing cycle; and in a third modification, the turntable and center-post are oscillated in a linear path toward and from the rim support to release the record next to be played.

Further in accordance with the invention, the rim support is adjusted toward or from the axis of rotation of the turntable to support a stack of records of any like diameter within wide limits, in readiness for playing without need for readjustment of the record-release mechanism. Further, and more particularly, it is provided that as the rim support is moved toward or from the turntable, the height of its ledge is varied to maintain it in alignment with the step of the centerpost and so avoid mulitple release or jamming during the record-release operation.

Further in accordance with the invention, to insure that the tone arm is clear of the path of a record being released, it is provided that as the rim support is adjusted for records of a selected diameter, there is concurrently effected a readjustment which predetermines the relations, existent during the record-changing cycle, between the angular position of the tone arm and the axes of the turntable and the tone arm. More particularly, such adjustment is provided by a cam moved by the rim support to effect change in position of the axis of the pickup arm, change in angular position of the pickup arm with respect to its axis, or both.

Further in accordance with the invention, the vertical and horizontal motions of the pickup arm required during a record-changing or record-playing cycle are effected by cam plates which engage an extension of the pickup arm and which are reciprocated by an element of the mechanism which oscillates the center-post toward and from the record rim support.

This application is a continuation-in-part of my co-pending application Serial No. 108,994, filed August 6, 1949, now abandoned, and is an improvement upon record playing apparatus disclosed in my application Serial No. 624,965, filed October 27, 1945, now abandoned.

For a more detailed understanding of the invention and for illustration of embodiments of it, reference is made to the accompanying drawings in which:

Figs. 20 to 25 show the relative positions of cam plates of Figs. 1–3 at different times in the record-changing cycle.

Referring to Figs. 1, 1A, 2 and 3 of the drawings as exemplary of record-changer embodying one form of the invention, the turntable 24 supported above mounting plate A is driven from suitable single or multispeed motor B supported below the mounting plate. The drive wheel 20 on the upper end of the motor shaft frictionally engages the rim 22 of the turntable to rotate it so long as the circuit of motor B is closed by the usual start-stop switch (not shown).

Figures 13, 14, 15A:
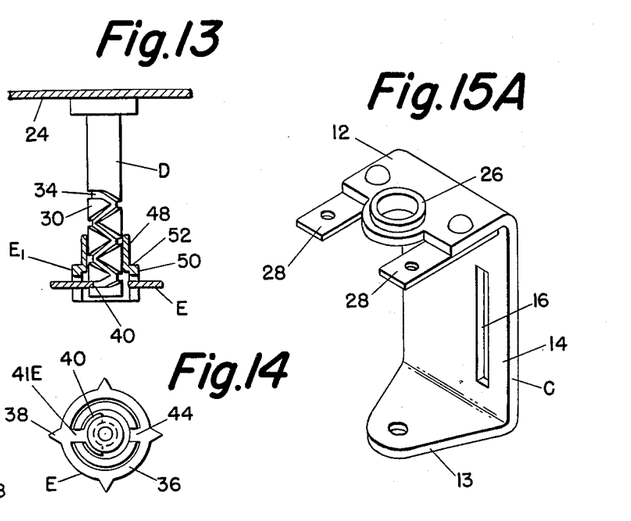
Fig. 13 is a side elevational view, partly in section, of the elements of Fig. 12 in their assembled relation.
Fig. 14 is a bottom plan view of Fig. 13.
Figs. 15A, 15B and 15C are perspective views of brackets respectively used in the three modifications.

The spindle D of the turntable is rotatable in bearing 26 which in this form of the invention is attached to the upper leg 12 of a bracket C, flexibly hinged to the base or mounting plate A of the changer by spring plates 28, or equivalent. (A bracket construction suited for this modification is shown in perspective in Fig. 15A.) The center post N extends upwardly from the point of attachment of its lower end to the lower leg 13 of bracket C through a bearing in the upper end of turntable spindle D and through the center holes of a stack of records R to be played.

The record stack is continuously supported above the turntable 24 by the step 96 of the inclined upper portion of the center-post N and by the ledge 86 of platform M. By so continuously supporting the stack both at its center and at its rim, the record stack is always stabilized against wobbling.

Figure 7:
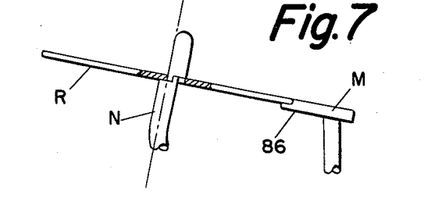

During a record-changing cycle of this modification, the bracket C, turntable 24 and center-post N are tilted as a unit, by mechanism later described, from the position shown in Fig. 2 to the position shown in Fig. 3 and thence back to the position shown in Fig. 2. Thus, the center-post N is moved in a plane including the axis of rotation of the turntable toward and from the support M for the rim of the stack. As the center-post N moves from its playing position (Fig. 4) to the right, all records of the stack move with the post except the lowermost record whose rim is engaged by the vertical wall of ledge 86 (Fig. 5) which forms a stop of height not greater than the thickness of a single record. If its rim is not fully engaged by such vertical wall, the sliding motion of the lowermost record is arrested, after insignificant initial movement of center-post N, but the remainder of them continue moving to the right with the post N, sliding over the now stationary lowermost record. The continued movement of post N to the right causes its step 96 to slide into the center hole of the lowermost record which therefore begins to drop (Fig. 6) at about the limit of movement of post N to the right. Particularly since the edge of dropping record is held against ledge 86, its path is initially in an arc whose center is at the ledge. The angle of the post N with respect to the arc mentioned will cause the falling record to be pulled completely from the ledge and allow it to drop onto the turntable 24 in centered position in readiness for playing. As the post N reverses its direction of motion and moves to the left towards its original position, it pulls the remainder of the stacked records into position with the new bottom record R resting in the ledge 86 and the step 96 (Fig. 7) with its rim engaged by, or at most slightly displaced from, the vertical wall or shoulder of the ledge. The record stack is thus supported both at its center and at its rim at all times—before, during, and after a change cycle.

For proper releasing action, the top surface of ledge 86 must be in substantial alignment with the step 96 to insure that a record resting on these surfaces shall be able to pass under the offset on post N. If the ledge is too high, the lowermost record will be jammed against the offset. If the ledge is too low, more than one record may drop during a change cycle. As later described, the ledge height is automatically reset to maintain such alignment as the platform M is reset for playing of records of diameter different from those previously played.

Figure 8:
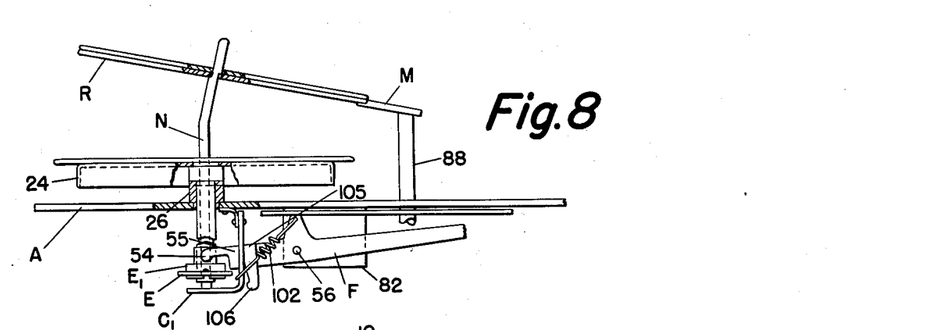
Fig. 8 is a fragmentary side elevational view of a second modification.
Figure 9:
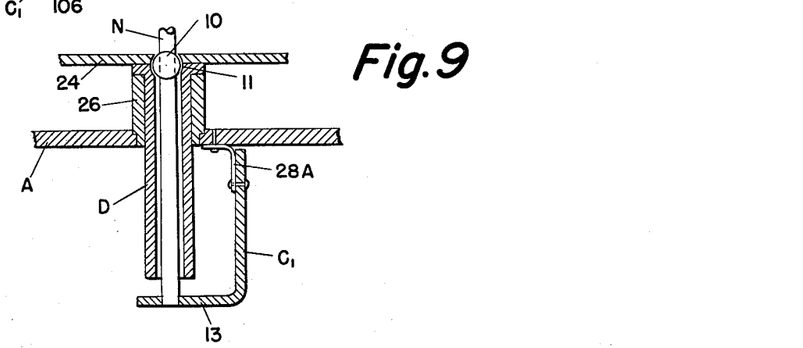
Fig. 9 is a sectional detail view of parts shown in Fig. 8.
Figure 15B:
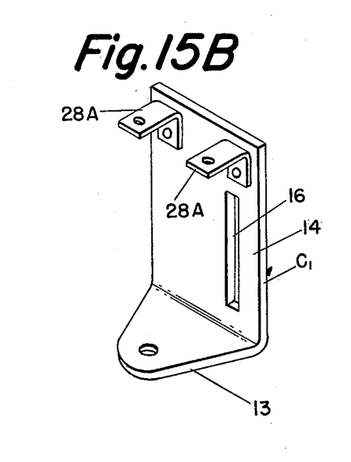

In the modification shown in Figs. 8 and 9, this same record-changing cycle of the center-post N (Figs. 4–7) is effected without tilting of the turntable. In this modification, the turntable bearing 26 is fixedly mounted upon the panel or plate A so that the turntable spindle D remains in vertical position and is not tilted when bracket $C_1$, corresponding with bracket C of Figs. 1 to 3, is rocked during the record-changing cycle. (A bracket construction suited for this modification is shown in perspective in Fig. 15B.) In this modification, as shown in Fig. 9, the center-post N is pivotally mounted in the turntable spindle D by a universal bearing exemplified by the ball and socket bearing 10, 11. The lower end of the center-post N is attached to or non-rotatably received by the lower leg 13 of the bracket $C_1$, biased as by spring 28A, normally to maintain the center-post N in the position of Figs. 4 and 8. When the bracket C is rocked, as by mechanism later described, the lower end of center-post N moves through a small arc about bearing 10 as a center so moving the center-post N, as discussed in connection with Figs. 4 to 7, toward and from the stack support M in a vertical plane including the axis of rotation of the turntable. In this modification, the tilting of the spindle with respect to the turntable produces sliding movement of the records of the played stack with respect to each other and the turntable. Such sliding movement of the records and the additional driving torque required to effect it are avoided with the construction previously described in which the turntable and centerpost are tilted as a unit so maintaining their axes in fixed position relative to each other.

In this modification (Figs. 8 and 9), since the turntable is not tilted, the motor 5 may be positioned for engagement of drive wheel 20 with any conveniently accessible point of the periphery of the turntable rim 22 whereas in the modification of Figs. 1 to 3 and in another modification subsequently described, the region of engagement must be near one of the ends of that inner rim diameter which is normal to the plane in which the spindle axis is moved for record-changing.

Figure 10:
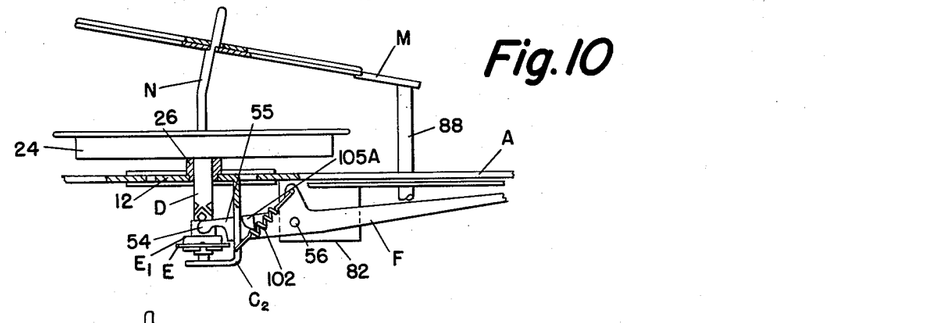
Figs. 10 and 11 are respectively fragmentary side and end elevational views of a third modification.
Figure 11:
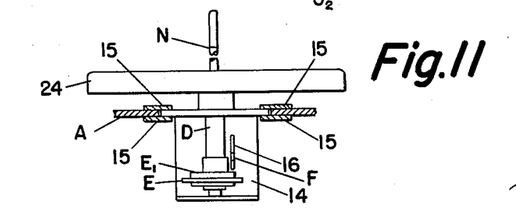
Figure 15C:
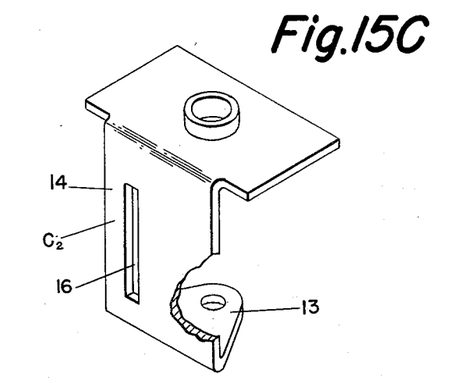

In the modification shown in Figs. 10 and 11, the spindle bearing 26 is fastened, as in the modification of Figs. 1 to 3, to the upper leg 12 of a movable bracket $C_2$ instead of to the stationary plate A. In Figs. 10 and 11, the bracket instead of being hinged to the frame plate A for pivotal movement, as in Figs. 1–3, is slidably mounted thereon by the guides 15 or equivalent so that during a record-changing cycle the center-post N moves linearly, i.e., without tilting, in a plane including the axis of rotation of the turntable, first to right toward support M and thence back to its original position so to effect release of the bottom record of the steak as shown by Figs. 4 to 7. A bracket construction suitable for this modification is per se shown in perspective in Fig. 15C.

For all three modifications above described, essentially the same mechanism may be used for effecting the record-changing movement of the center-post N and for effecting the necessary movements of the pickup arm K, and it shall be understood the following description of the actuating mechanism is generally applicable to all three.

Figure 12:
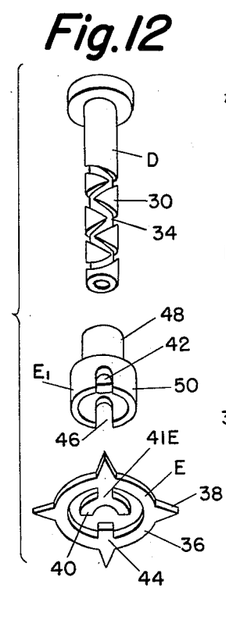
Fig. 12 is an exploded view of the cam follower, turntable spindle and sleeve utilized in the three modifications.

Below its bearing 26, the shank 30 of turntable spindle D is provided with a reciprocating cam groove 34 which continuously receives the semi-circular cam shoe 40 (Figs. 12–14) of a cam follower E having a ring-like body 36 from which radially extend a plurality of short fingers 38. The arm 41E which connects shoe 40 to body 36 of the cam-follower is received by slot 42 in the lower portion 50 of a sleeve $E_1$ whose upper portion 48 slidably engages the shank 30 of the turntable spindle D. A second arm 44 of the follower E is received by a second slot 46 in the lower enlarged portion 50 of sleeve $E_1$. Thus, with the shoe 40 in the cam groove 34, the ring-like body of the cam-follower E is concentric with the axis of the turntable spindle D and the arms 41E, 44 fit in the slots 42, 46 in the lower portion of the sleeve $E_1$ as in Figs. 13 and 14. This assembly permits the cam follower E to pivot about the axis through arms 41E, 44 when the cam shoe 40 follows the reciprocating cam groove at its reversing ends.

During playing of a record, the cam follower E and sleeve $E_1$ rotate in unison with the turntable spindle D. Upon completion of playing of a record, rotation of the cam follower E is stopped as by movement of a plunger 18 (Fig. 2) into the path of fingers 38 of the cam follower E where it engages one of these angularly spaced fingers. Although this plunger is symbolically shown to be actuated by an electromagnetic trip P, a mechanically actuated plunger could be used. As the follower is now no longer free to rotate with the spindle, it is moved upwardly axially along spindle D (from the position shown in Figs. 2, 8 and 10) by engagement of its shoe 40 with cam groove 34 of the spindle. After small upward movement of the cam follower, the end 55 of a rocker arm F extending through slot 16 in the backplate 14 of bracket C (or $C_1$, $C_2$) lies in the path of fingers 38, so that despite its disengagement from the trip member 18, the cam follower is prevented, by its engagement with arm F, from rotation with the spindle and continues its upward movement. During such continued movement, the shoulder 52 of sleeve $E_1$ engages the extension 54 of rocker arm F, causing the rocker arm to rotate about its pivot 56 in clockwise direction.

Figure 1:
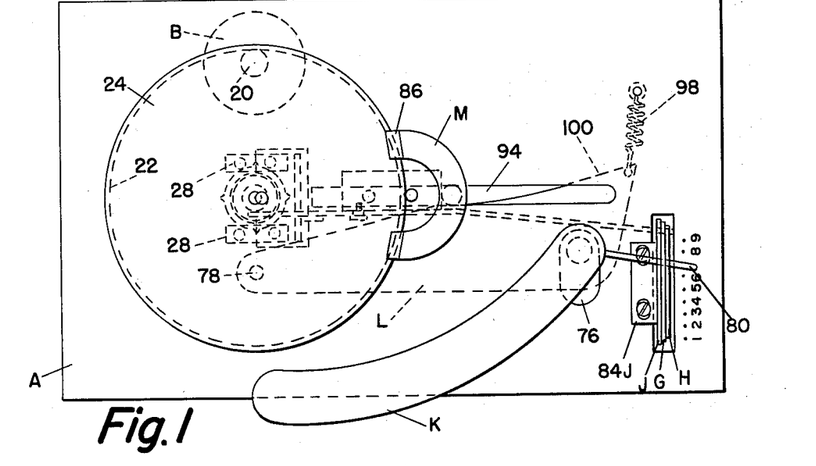
Figs. 1 and 1A are each a top plan view of one form of record-changer embodying the invention.
Figure 2:
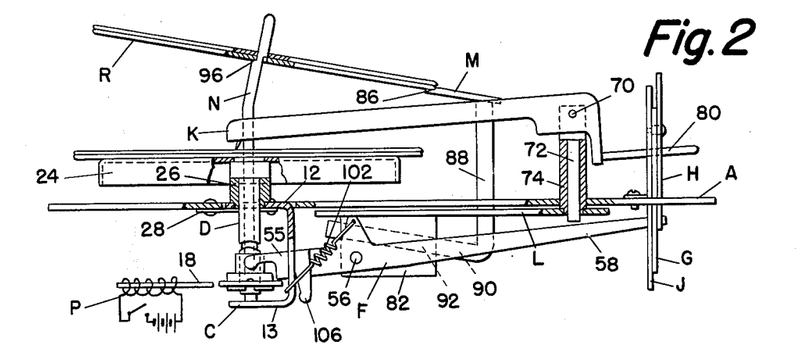
Fig. 2 is a side elevational view, partly in section and with parts broken away to show elements of Figs. 1 and 1A in record-playing position.
Figure 3:
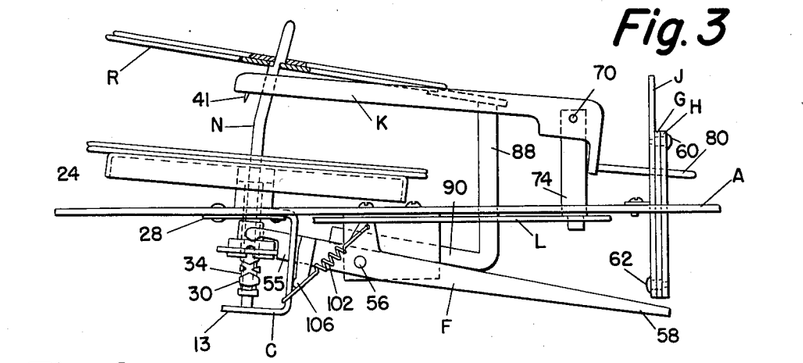
Fig. 3 is similar to Fig. 2, but with elements in position half-way through a record-changing cycle.
Figures 4, 5, 6:
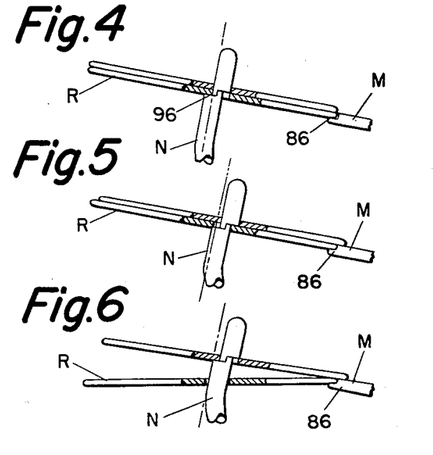
Figs. 4 to 7 are explanatory figures referred to in discussion of the record-changer of Figs. 1 to 3 and subsequent modifications.
Figure 16A:
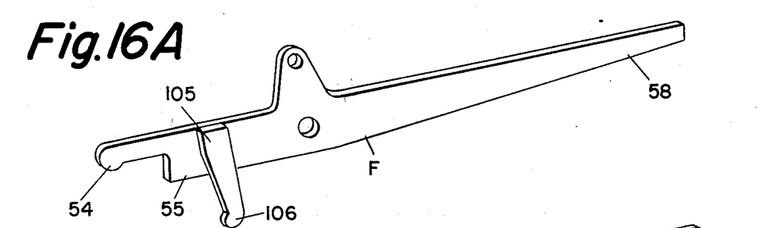
Figs. 16A and 16B are perspective views of rocker arms of the several modifications.

In the modification of Figs. 1 to 3, this movement of rocker arm F is used to tilt the bracket C against the bias of springs 28 and 102 from the position shown in Fig. 2 toward the position shown in Fig. 3 so to move to the center-post N through the first half of its record-changing cycle (Figs. 4 to 6). Specifically, during this movement of arm F, its finger 106 engages the backplate 14 of the hinged bracket C, causing it to tilt in clockwise direction. For continued rotation of the turntable spindle, the cam follower E reaches the upper limit of its travel, tilts about the pivotal engagement of its arms 41E, 44 with sleeve $E_1$ and thence is moved downwardly by cam groove 34 axially of spindle D to its original position. During this descent of the cam follower and sleeve, the rocker arm F and bracket C swing in counterclockwise direction to their original position, the gage block 105 of arm F (Fig. 16A) serving as a stop coacting with spring 102 accurately to fix the playing positions of the center-post and turntable axes. For a brief time after the extension 54 of arm F reaches the lower limit of its travel, the cam follower E is still retained from rotation with spindle D but the continued downward motion of the cam follower shortly effects release of finger 38 from the end 55 of arm F whereupon the cam follower, now at the bottom of the cam groove, again rotates freely with the spindle.

In the modification shown in Figs. 8 and 9, the above described axial movement of the cam follower E and sleeve $E_1$ is similarly utilized to actuate the arm F and through the resultant tilting movement of bracket $C_1$ to effect the previously described record-changing movement of the center-post N of this modification.

Figures 16B, 17:
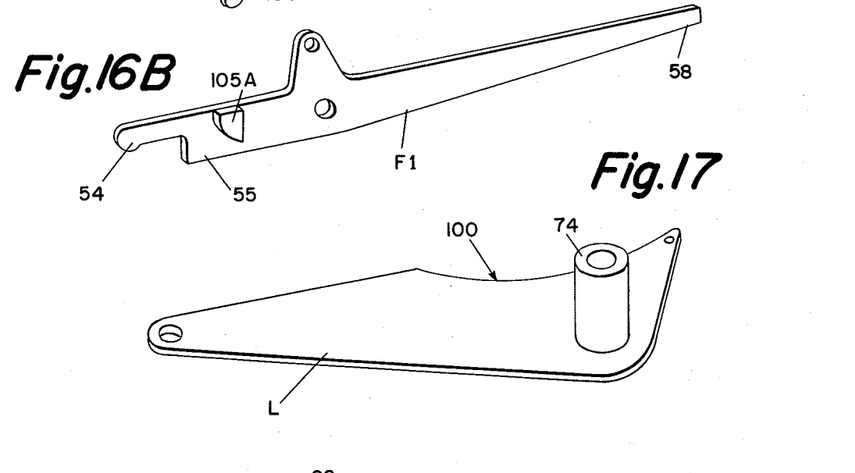
Fig. 17 is a detail view of the cam plate and pickup arm bearing shown in Figs. 1–3.

In the modification shown in Figs. 10 and 11, the above described axial movement of cam follower E and $E_1$ is similarly utilized to actuate a rocker arm $F_1$, identical with arm F, except that since in this modification there is no tilting of bracket C, the finger 106 of arm F may be omitted (Fig. 16B). When arm $F_1$ is rotating in clockwise direction during a change cycle, spring 102 maintains engagement between bracket $C_2$ and the gage block 105A and so causes the bracket $C_2$ to slide back and forth along guides 15 to effect the previously described record-changing movement of center-post N.

Figure 1A:
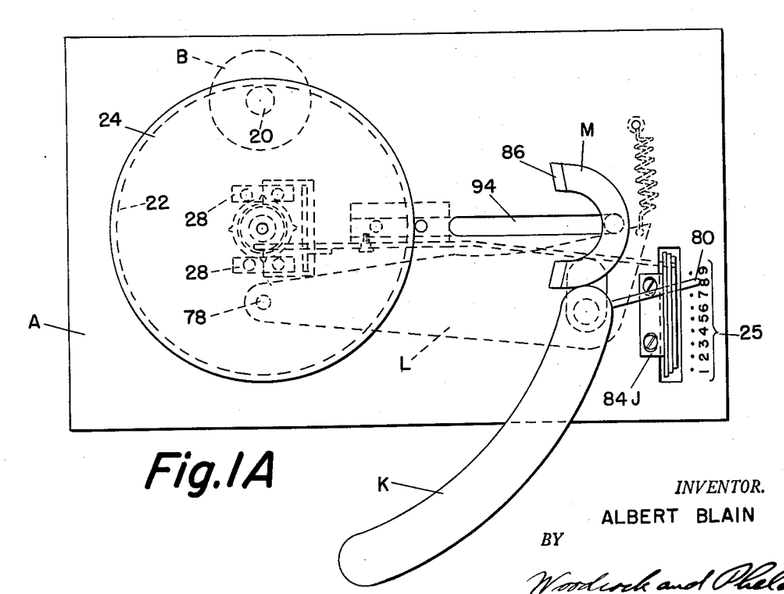

Because in all three modifications the record-changing operation does not require the platform M either to move or to support any moving changer-mechanism, they are all suited for playing a stack of records of any one diameter within any desired range of diameters simply by providing for adjustment of platform M toward or from the turntable axis in the plane of movement of center-post N. In a preferred arrangement for accomplishing such flexibility, the mounting plate A as shown in Figs. 1 and 1A is provided with a slot 94 extending radially from the axis of rotation of turntable 24 in the plane of the previously described movement of center-post N, the length of the slot corresponding with the range of record sizes to be played. The platform post 88 extends through the guide slot 94 and below the baseplate A is provided with angular extension 90 which slidably fits bearing 92 in bracket 82 (Fig. 2).

To play a stack of records of any one diameter within a continuous range of diameters, the platform post 88 is simply moved so that the ledges 86 of the platform support the rim of the stack as centrally supported by step 96 of the center-post N. During this adjustment the proper orientation of the platform and vertical positioning of its post is maintained by bearing 92 and slot 94. The platform M remains stationary until adjusted to support records of another diameter. The change from playing records of one to another diameter does not require any resetting or readjustment of the record-release mechanism.

Automatically to compensate for the greater thickness of the larger diameter records, the extension 90 of the platform post 88 is at an acute angle to baseplate A with the apex of the angles directed toward the axis of rotation of the turntable. Thus, as the platform M is moved away from that axis for larger diameter records, the distance of the platform M above base A is progressively decreased to avoid record jamming. Conversely, as the platform M is moved toward the turntable for smaller diameter records, the platform height is progressively increased to avoid multiple release of records. By such arrangement, the incline at which a large record rests on step 96 and ledge 86 is greater than the incline at which a small record rests on the step and ledge to preserve the relationship of step and ledge required for proper releasing action.

During a record-changing cycle, the tone arm or pickup arm K must be clear of the path of the record being released to fall from the bottom of stack onto the turntable 24. To meet this requirement without undue delay between successive playing of the smaller records, the location of the pivotal axis of the pickup arm with respect to the turntable axis and/or the angular position of the pickup arm with respect to its axis during the changing cycle are varied for the different sizes of records. In the preferred arrangements now described, these adjustments are effected automatically concurrently with repositioning of the stack-platform M for playing of records having a diameter different from those previously played.

In Figs. 1, 1A, 2 and 3, the pickup arm K is pivotally mounted at 70 to a shaft 72 supported by a bearing 74 extending through elongated hole 76 in the base A and attached to a cam plate L pivotally mounted at 78 to the underside of the base. A spring 98 maintains contact between the cam surface 100 (Fig. 1) of plate L and the post 88 of the stack platform M. As the post 88 is moved in slot 94 to accommodate a different diameter of record, the plate L swings about its pivot 78 correspondingly to change the position of the pivotal axis of pickup arm K to one suited for the new diameter of record. Concurrently to shift the angular position of the pickup arm K with respect to its bearing 74, and for other purposes later described, the pickup arm K is provided with a rearwardly extending arm or pin 80.

Figure 18:
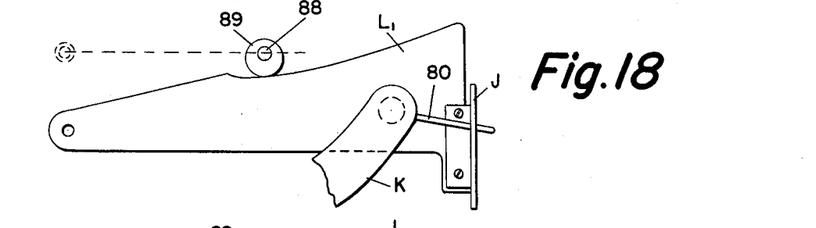
Figs. 18 and 19 are modifications of the arrangement shown in Figs. 1–3 for concurrent adjustment of the pickup arm and record-support to accommodate different diameters of records.
Figure 19:
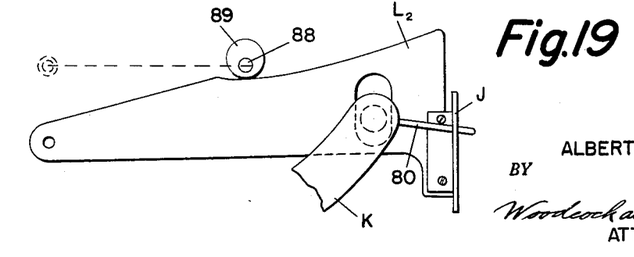
Figure 20:
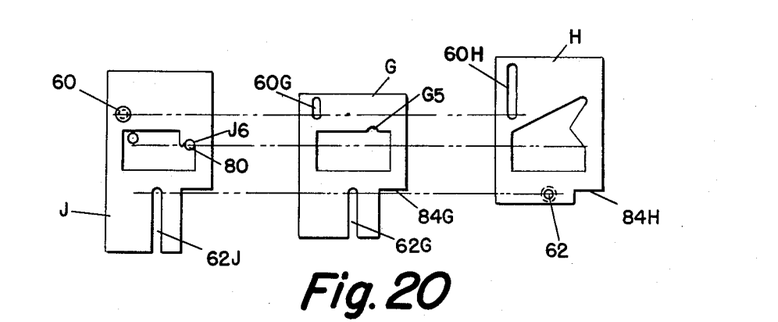
Figure 23:
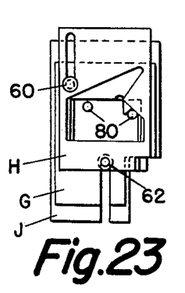
Figure 24:
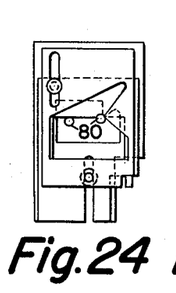
Figure 25:
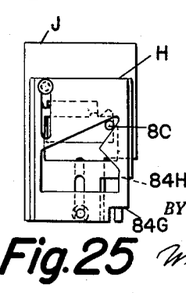

Before loading the record-changer with records, the pickup arm K is manually placed at its outermost position by effecting engagement of its pin 80 with notch J6 in the right-hand portion of bracket plate J (Figs. 20 and 23). Thus, as support M is moved to position for which its ledges 86 support the rim of the bottom record and with the edge of the bottom record against the ledge shoulder, both the pivotal axis and angular position of the pickup arm with respect to the turntable axis are correspondingly shifted for the new diameter of record. The ranges through which the support M, the pivotal axis of the pickup arm and the angular position of the pickup arm are concurrently adjusted are shown by comparison of Figs. 1 and 1A. Such result is accomplished in the arrangement just described by locating the bearing 74 of the pickup arm upon the pivotal cam plate L and using a fixed bracket J. Alternately, both bearing 74 and bracket J may be mounted on a pivoted extended cam plate L1 (Fig. 18) or the bracket J may be mounted on a pivoted extended cam plate L2 with bearing 74 fixed to base A (Fig. 19). As shown in Figs. 23, 24 and 25, the surfaces 84G and 84H of bracket plates G, H (later discussed) are sufficient to permit the end 58 of rocker arm F to maintain engagement with them through their full adjustment range with cam plate L1 or L2.

Reverting to description of the arrangement shown in Figs. 1–3, the bracket plate J serves as a guide and mount for the vertically reciprocable plates G and H (Figs. 23–25) whose bottom edges 84G, 84H rest upon the end 58 of arm F which, as previously described, rocks from and back to the position shown in Fig. 2 during a record-changing operation. As later specifically described, the movement of these plates relative to each other and to bracket J effect vertical and horizontal movements of the pickup arm during the changing cycle. At other times the pickup arm is disengaged from the plates and is thus free to permit its being moved either manually or by the grooves of a record.

The bracket J is mounted as by flange 84J (Figs. 1, 1A) to the baseplate A and carries a fixed stud 60 (Fig. 20) which slidably engages the slots 60G, 60H of cam plates G, H. The stud 62 fixed to cam plate H slidably engages the slots 62G, 62J of cam plate G and bracket J. The studs 60, 62 maintain vertical alignment of plates J, G, H during their relative vertical movement.

Figure 22:
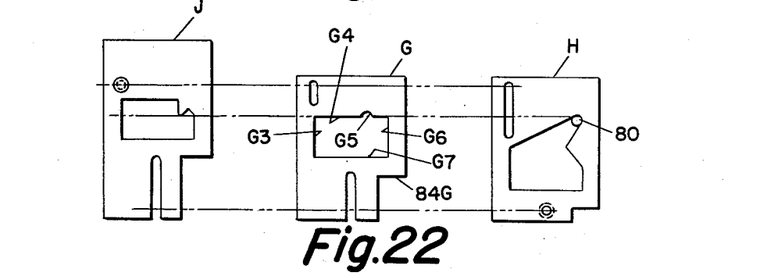

As best shown in Figs. 20–22, the cam opening in plate J is defined, progressing in clockwise direction, by a vertical edge J3, a horizontal edge J4, a second vertical edge J5, notch J6, a third vertical edge J7 and a second horizontal edge J8. The opening in plate H is defined, progressing in the same direction, by vertical edge H3 upwardly inclined edge H4, inwardly downwardly inclined edge H5, outwardly downwardly inclined edge H6, a second vertical edge H7 and horizontal edge H8. The opening in cam plate G is similarly defined by vertical edge G3, horizontal edge G4 having a notch G5, vertical edge G6 and horizontal edge G7. The weight of plates G and H is sufficient to maintain them in engagement with arm F and to overbalance the pickup arm assembly. A tension spring between plate G and arm F and a tension spring between plate H and arm F could be used as an alternative method of overcoming the weight of the pickup arm assembly.

After loading the record-changer (with pin 80 of the pickup arm engaged by notch J6 of plate J as above stated), a tripping means, such as a switch for a solenoid, may be manually operated to cause the end 58 of the arm F to move downwardly from the position shown in Fig. 2 whereupon the plates G, H descend in unison from the positions shown in Figs. 20 and 23 until the upper edge of slot 60G engages fixed stud 60 (Figs. 21 and 24) of stationary plate J. For further downward movement of arm end 58, plate G remains at rest but plate H continues to move downwardly to the position shown in Figs. 22 and 25. During initial downward movement of plate H, its cam surface H6 forces pickup arm pin 80 slightly downwardly and to the left out of notch J6 and into notch G5 (Figs. 21, 24) of the now stationary plate G. As plate H continues to move downwardly, its cam surface H4 moves pin 80 horizontally to the right to the position shown in Figs. 22, 25, 26B. For this position of pin 80, the pickup arm K is held in its horizontal outermost position clear of the path of the stacked records sequentially to be dropped onto the turntable 24 and is also held in raised position sufficiently above the plane of the turntable to clear the top of the stack built up thereon by the previously dropped records.

Figure 26:
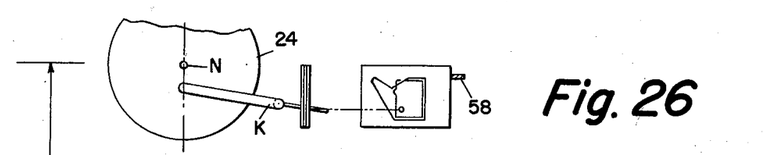
Figs. 26 to 26G show the positions of the tone arm and corresponding positions of the cam plates at different times during the change cycle and the playing period.
Figure 26A:
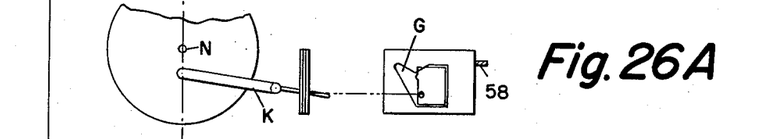
Figure 26B:
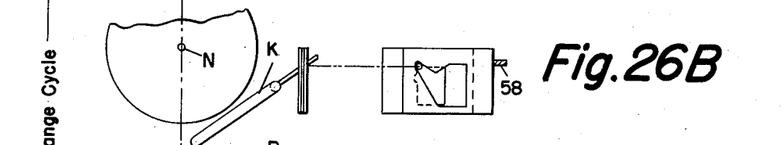
Figure 26C:
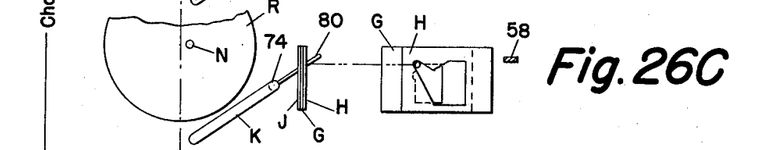
Figure 26D:
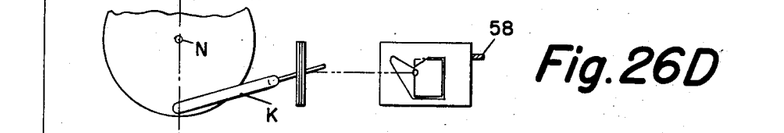

When rocker arm 58 reaches its lowermost position as shown in Figs. 3 and 26C, it reverses its motion and returns to the position shown in Fig. 2 (as previously discussed in connection with movement of the spindle N to drop the records in succession from the stack). During the first part of its upward movement, the arm 58 engages and effects upward movement of plate H alone, the joint action of a moving cam surface H5 of plate H and the stationary edge of G4 of plate G effecting movement of pin 80 to the left from the position shown in Fig. 26C until pin 80 enters notch G5 of plate G (Fig. 26D). For this movement of its pin 80, the pickup arm K is moved from its outermost position clear of the path of fall of the records to a position over the starting groove of the last dropped record.

Figure 26E:
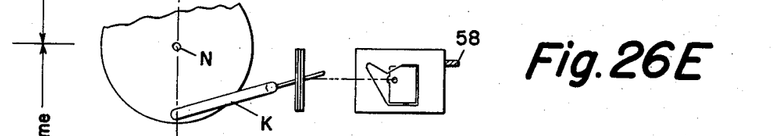

As arm 58 continues to move upwardly, it engages the lower edge of plate G and so moves both plates G and H upwardly. Thus, pin 80 is allowed to rise with consequent lowering of the pickup arm K for engagement of needle 41 with the record groove. Pin 80 is disengaged from notch G5 as the plates G, H continue moving to their uppermost position as shown in Fig. 26E.

Figure 26F:
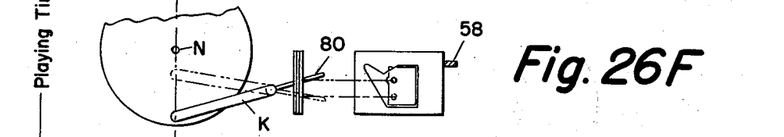
Figure 26G:
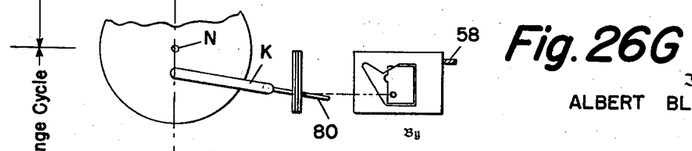

The extension pin 80 of the pickup arm is now free of control or restraint by the plates J, G and H and during playing of the record is moved from right to left, Fig. 26F, by the record groove until at the end of the record a trip mechanism (not shown) momentarily engages the cam follower E to effect, as above described, a cycle of movement of the changing mechanism as illustrated in Figs. 26–26G.

During downward movement of end 58 of arm F with consequent downward movement of plates G and H, the cam surface G4 of plate G presses downwardly on pin 80 (Fig. 26A) to lift the needle end of pickup arm K from the played record. As the plates G, H approach the limit of their ultimate downward movement with end 58 of arm F, the surface H4 of plate H moves pin 80 to the extreme right position (Figs. 22, 25). Thus, the raised pickup arm K is moved to its outermost position (Fig. 26B), permitting the next record to be dropped onto the turntable without obstruction by the pickup arm K.

When the plates G, H reach their ultimate downward positions, they are disengaged by the end 58 of rocker arm F which continues its clockwise rotation until it reaches its ultimate lower position (Fig. 3) and causes the post N to move toward the record support M to release a record (Figs. 4–6, 26C).

As the rocker arm F reaches its ultimate lower position (Fig. 3), the cam follower E reverses its direction of travel and causes the rocker arm to move in a counterclockwise direction to permit the post N to move away from the record-rim support M and thus position the record stack for the next change cycle as fully explained in discussion of Figs. 4–6. On continuing its counterclockwise rotation, the end 58 of the rocker arm F is raised to engage the plate H and, as the end 58 continues to raise, surface H4 moves the pin 80 to the right into groove G5 (Figs. 21, 24) to position the pickup arm K over the starting groove of the record as shown in Fig. 26D. As the end 58 continues its upward movement with the plate H, it engages the plate G and carries it upward to permit the pickup arm K to lower into engagement with the last released record (Fig. 26E), thus completing a change cycle.

Fig. 26F indicates the movement of the pickup arm K during the time a record is played until a tripping means starts a new change cycle at the position shown in Fig. 26G which is the same as Fig. 26.

Thus, upon completion of playing of each record of the stack, there is initiated an automatic record-changing cycle during which the arm F is rocked to move the spindle N toward and from the record-support M for release of the next record from the stack of unplayed records and to move the plates G, H in proper direction and sequence to lift the pickup arm K from the record just played to swing it to its outermost position during release of the next record to be played and then to lower it for playing of the last-released record.

As stated above, the pickup arm K is free of plates G, H during playing of a record so that it may then be moved manually in vertical and horizontal direction to play or replay any desired portion of the record without effect upon the record-changing mechanism. An arbitrary calibration scale 25 (Figs. 1, 1A) on base A with pin 80 as its index is provided to assist in locating desired portions of a recording.

To provide for aligning the record player so that the needle 41 upon automatic lowering of the pickup arm will properly locate the starting groove of the record, the bracket J may be shifted by means of slots in the flange 84J of Fig. 1. Alternate means for making this alignment is shown in Figs. 18, 19 wherein the eccentric bushing 89 can be adjusted on post 88 to locate the needle over a major portion of the recording. Thus, where it is desired to automatically eliminate playing of the outer recordings of a record having more than one recording on a side, the bracket J may be shifted or the eccentric 89 may be turned so that the needle will be positioned where it is desired.

Because of the simplicity of the changer mechanism, the time required for it to perform its cycle is very short. For example, of 78 r.p.m. records, the interruption between playing of successive records is only about 3 seconds. Furthermore, because of its simplicity and lack of critical adjustments for proper timing of its components, the changer mechanism is not subject to need for frequent servicing.

Another advantage gained in the arrangement and location of the component parts is that they are very easy to reach and service since the mechanism is visible during the complete change cycle. Moreover, since all of the parts that might wear out consist of small sheet metal stampings, their replacement cost is very low.

It is also again to be noted that the changer can be set to play any diameter of records within a continuous range defined by the wide limits of adjustment of post 88 without removal or insertion of any elements, and without need for any readjustment of the mechanism by the operator. This permits the automatic playing of odd size records such as those used for home recording.

What is claimed is:

1. A record player suited to play records of any diameter within a wide continuous range of diameters comprising a turntable, a pivotally mounted pickup arm having an extension, a bracket for engaging said extension, a member adjustable with respect to said bracket in direction radially of the axis of rotation of said turntable to any fixed position intermediate the limits of its range of adjustment to correspond with a standard or odd diameter of record, and mechanism including said member for shifting the positional relation between the axes of said arm and turntable and the point of engagement between said extension and bracket concurrently with adjustment of said member to reposition the pickup arm for any selected record diameter whether standard or odd.

2. An arrangement as in claim 1 in which the bracket is mounted in fixed position relative to the turntable axis; which includes a bearing for the pickup arm, said bearing being supported for movement with respect to said bracket and the turntable axis; and which includes cam structure coacting with said adjustable member to effect aforesaid compensating shift in positional relationships.

3. An arrangement as in claim 1, in which the bracket and the pickup arm bearing are mounted on movable supporting structure, and in which cam structure coacts with said adjustable member and said movable supporting structure to effect aforesaid compensating shift in positional relationships.

4. An automatic record-changer comprising a turntable, a pickup arm mounted for movement about horizontal and vertical axes and having an extension movable with said arm about both of said axes, relatively movable plates jointly providing a cam opening receiving said extension, and mechanism for effecting relative movement of said plates to vary said cam opening thereby to effect automatic movement of said pickup arm about said horizontal and vertical axes during changing of a record and to provide an opening during playing of a record which permits movement of the pickup arm by the record groove or by hand.

5. A record player suited to play records of any diameter within a wide continuous range of diameters comprising a turntable, a slidable member adjustable radially of the axis of rotation of said turntable to fixed positions respectively corresponding with the diameters of records to be played, a pivotally mounted pickup arm capable of being shifted, and cam structure mounted for movement relative to said radially adjustable member and cooperating with said radially adjustable member and said pickup arm to shift the positional relation between the turntable and the pickup arm as said member is adjusted for a different size record, said cam structure remaining at rest in its adjusted position until said slidable member is readjusted to a different fixed position corresponding with a different selected diameter of record.

6. An arrangement as in claim 5, in which the pickup arm has an extension, in which a cam bracket has a notch engaging said extension to determine the angular position at which the arm engages a record on the turntable, and in which the bracket is fastened to a fixed support with provision for adjustment effecting precise alignment with the starting groove of different diameter records.

7. An arrangement as in claim 5 in which the radially adjustable member is additionally provided with an eccentric adjustable for precise alignment of the pickup arm with the starting groove of a selected diameter of record.

8. In a record-changer comprising a revolving turntable, a non-revolving center-post to support the center of a stack of records over said turntable, a record support post adapted to support the margin of the lowermost record of the stack, a mounting plate, an adjusting plate to slide on said mounting plate, a vertical bearing mounted on said adjusting plate, a pickup arm, a shaft to rotate in said bearing and to which said pickup arm is pivoted, a cam surface on said adjusting plate to engage said record support post, and means to regulate the position of said record support post to suit any record diameter and, through the engagement of said cam surface of the adjusting plate with said record support post, to vary the distance from the axis of rotation of said turntable to the axis of said shaft of the pickup arm.

9. In an automatic record changer of the type in which a non-rotating unitary centerpost supporting a stack of records at its center is moved to and from structure supporting the record stack at its outer lower edge to release the bottom record for playing, a hollow turntable spindle having a reciprocating cam groove closed on both ends, said spindle extending downwardly below the baseplate of the record changer, bracket structure supported for to and fro movement in a vertical plane through the axis of rotation of the turntable and having an arm spaced below the baseplate for engagement with the lower end of the centerpost which projects through and beyond said turntable spindle, a sleeve and cam-follower assembly encircling said spindle and during playing of a record rotating with said spindle at one end of said cam groove thereof, means for initiating a record-changing cycle comprising structure momentarily moved into engagement with said assembly to preclude its rotation with said spindle whereupon said assembly moves axially of the spindle to the other end of said cam groove and thence back to said one end for resumption of rotation with the spindle, and a pivoted arm rocked by said assembly during its aforesaid movement axially of the spindle and coupled to said bracket structure to effect its aforesaid to and fro movement in said plane and thereby effect the record-releasing movement of the centerpost.

10. A record-changer arrangement as in claim 9 in which said centerpost and said spindle are both supported by said bracket for to and fro movement in said plane by said pivoted arm during the record-changing cycle.

11. A record-changer arrangement as in claim 10 in which the bracket is pivotally supported for angular movement by said pivoted arm about an axis perpendicular to said plane whereby said spindle and said centerpost are concurrently tilted in said plane during the record-changing cycle.

12. A record-changer arrangement as in claim 10 in which the bracket is slidably supported on the baseplate for rectilinear to and fro movement in said plane by said pivoted arm during the record-changing cycle.

13. A record-changer arrangement as in claim 9 in which the turntable is rotatably supported by the baseplate, in which the bracket is pivotally supported for angular movement by said pivoted arm about an axis perpendicular to said plane whereby said centerpost engaged at its lower end by said bracket is tilted in said plane with respect to the turntable during the record-changing cycle.

14. A record-changer arrangement as in claim 9 additionally including reciprocating cam plates actuated by said pivoted arm during its movement by said sleeve and cam-follower assembly, and in which an extension of the pickup arm of the record-changer is engaged and moved by said cam plates to effect during the record-changing cycle both vertical movement of the pickup arm toward and from the turntable and horizontal movement of the pickup arm toward and from the axis of rotation of the turntable.

15. A record-changer arrangement as in claim 14 in which said supporting structure for the outer edge of the record stack is adjustable in said vertical plane to support record stacks of respectively different diameters and extends below the baseplate, and in which repositioning means below said turntable and engaged by said supporting structure is adjusted concurrently therewith to change the positional interrelationship of said reciprocating cam plates, said extension of the pickup arm, and the axis of the turntable for playing records of the selected diameter.

16. A record-changer arrangement as in claim 15 in which the repositioning means includes a pivoted cam plate which pivotally supports the pickup arm, and in which an extension of said arm engages a bracket mounted on said cam plate, said cam plate having a cam surface continuously engaged below the baseplate by said record-supporting structure.

17. A record-changer arrangement as in claim 15 in which the pickup arm swings about a fixed axis and is provided with an extension, and in which the repositioning means includes a pivoted cam plate which supports a bracket engaging said extension, said cam plate having a cam surface continuously engaged below the baseplate by said record-supporting structure.

18. In an automatic record changer of the type in which a non-rotating unitary centerpost supporting a stack of records at its center is moved toward and from structure supporting the record stack at its outer lower edge to release the bottom record for playing, a hollow turntable spindle having a reciprocating cam groove closed on both ends, said spindle extending downwardly below the baseplate of said record changer, bracket structure supported for to and fro movement in a vertical plane through the axis of rotation of said turntable and having an arm spaced below the baseplate for engagement with the lower end of the centerpost which projects through and beyond said turntable spindle, a sleeve and cam-follower assembly encircling said spindle and during playing of the record rotating with said spindle at one end of the groove thereof, means for initiating a record-changing cycle comprising structure momentarily moved into engagement with said assembly to preclude its rotation with said spindle whereupon said assembly moves axially of the spindle to the other end of said cam groove and thence back to said one end for resumption of rotation with the spindle, a pivoted arm rocked by said assembly during its aforesaid movement axially of the spindle and coupled to said bracket structure to effect its aforesaid to and fro movement in said plane and thereby effect the record-releasing movement of the centerpost, reciprocating cam-plates actuated by said pivoted arm during its aforesaid rocking movement and engaging and moving an extension of the pickup arm of the record-changer to effect during the record-changing cycle both vertical movement of the pickup arm toward and from the turntable and horizontal movement of the arm toward and from the axis of rotation of the turntable, said structure for supporting the outer edge of the record stack extending below the baseplate and adjustable in said vertical plane selectively to support record stacks of respectively different diameters, and repositioning means comprising a stationary bracket engageable by said extension of the pickup arm and a pivoted cam plate which pivotally supports the pickup arm and has a cam surface continuously engaged below the baseplate by said adjustable record-supporting structure to effect upon adjustment thereof concurrent change of the positional interrelationship of said reciprocating cam plates, said extension of the pickup arm and the axis of the turntable for playing records of the selected diameter.

19. In an automatic record player, a cam member rotatable with the turntable of the record player and having a reciprocating cam groove, a cam-follower continuously in said groove and rotatable with and movable axially of said cam member, structure movable into engagement with said cam-follower to preclude its rotation with said cam member and to effect its movement axially of said cam member, a pivoted arm rocked by said cam-follower during its aforesaid movement axially of said cam member, and means for supporting a stack of records including a stationary side support and a shouldered centerpost extending through the turntable and movable by said pivoted arm toward and from said stationary side support to release the bottom record of the stack.

20. An arrangement as in claim 19 additionally having means including an extension on the pickup arm of the record player and relatively movable cam plates engaging said extension and reciprocated by the aforesaid pivoted arm to effect horizontal and vertical movements of the pickup arm.

References Cited in the file of this patent
UNITED STATES PATENTS

| | | |
|---|---|---|
| 2,235,693 | Wells | Mar. 18, 1941 |
| 2,271,001 | Fortune | Jan. 27, 1942 |
| 2,289,357 | Green | July 14, 1942 |
| 2,343,992 | Morrison | Mar. 14, 1944 |
| 2,374,570 | Weaver | Apr. 24, 1945 |
| 2,396,094 | Gay | Mar. 5, 1946 |
| 2,397,932 | Erwood et al. | Apr. 9, 1946 |
| 2,453,123 | Erwood | Nov. 9, 1948 |
| 2,488,137 | Morrison | June 15, 1949 |
| 2,558,060 | Rudolph | June 26, 1951 |
| 2,578,792 | Faulkner | Dec. 18, 1951 |
| 2,591,515 | Dale | Apr. 1, 1952 |
| 2,613,081 | Fisher | Oct. 7, 1952 |
| 2,645,496 | Baxter | July 14, 1953 |
| 2,676,805 | Tourtellot | Apr. 27, 1954 |

FOREIGN PATENTS

| | | |
|---|---|---|
| 573,419 | Great Britain | Nov. 20, 1945 |
| 590,563 | Great Britain | July 22, 1947 |
| 117,708 | Sweden | Nov. 26, 1946 |